April 30, 1957   N. G. NORTON, SR   2,790,474
POTATO CUTTER
Filed June 21, 1956   2 Sheets-Sheet 2
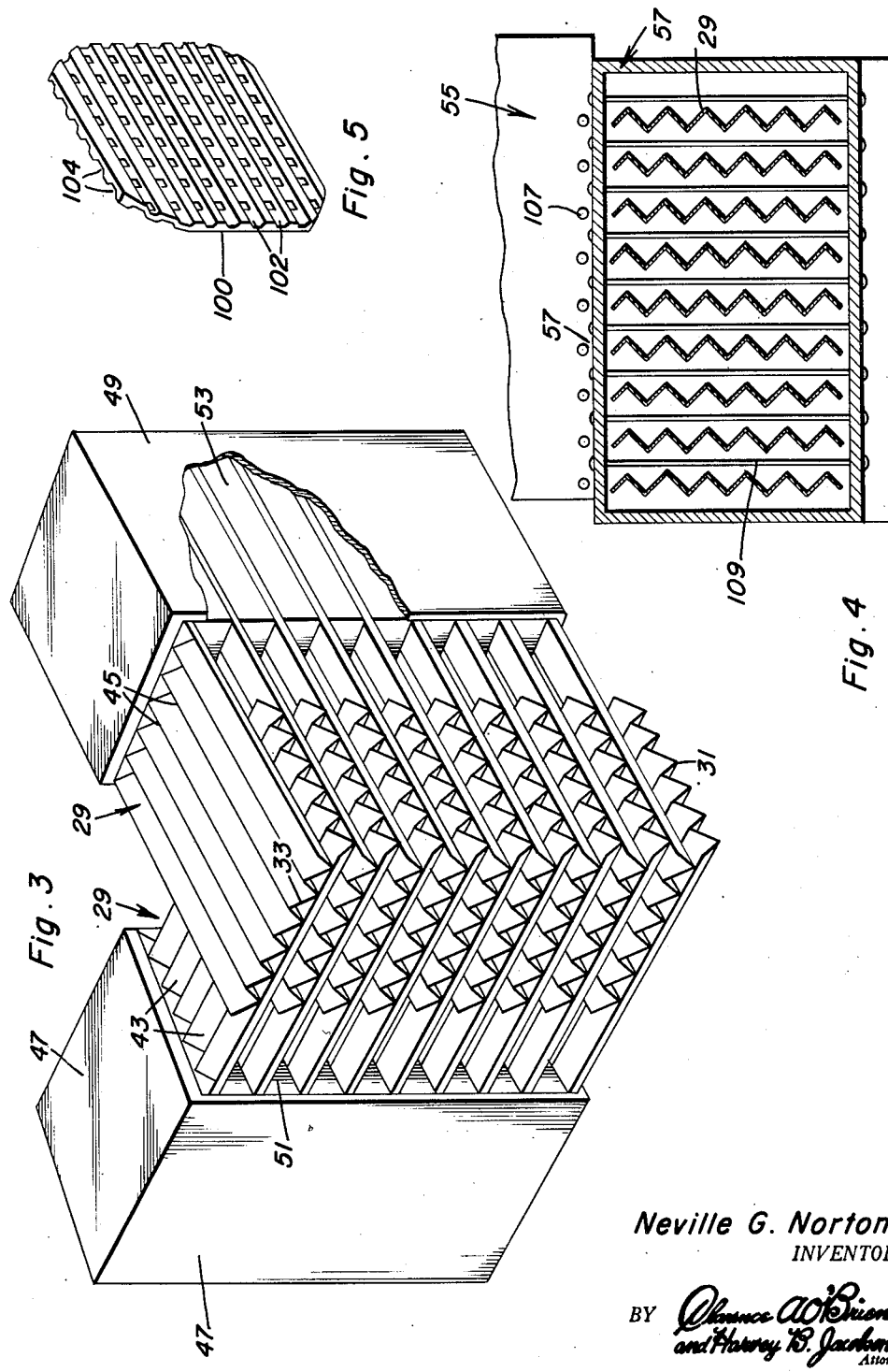
Neville G. Norton, Sr.
INVENTOR.

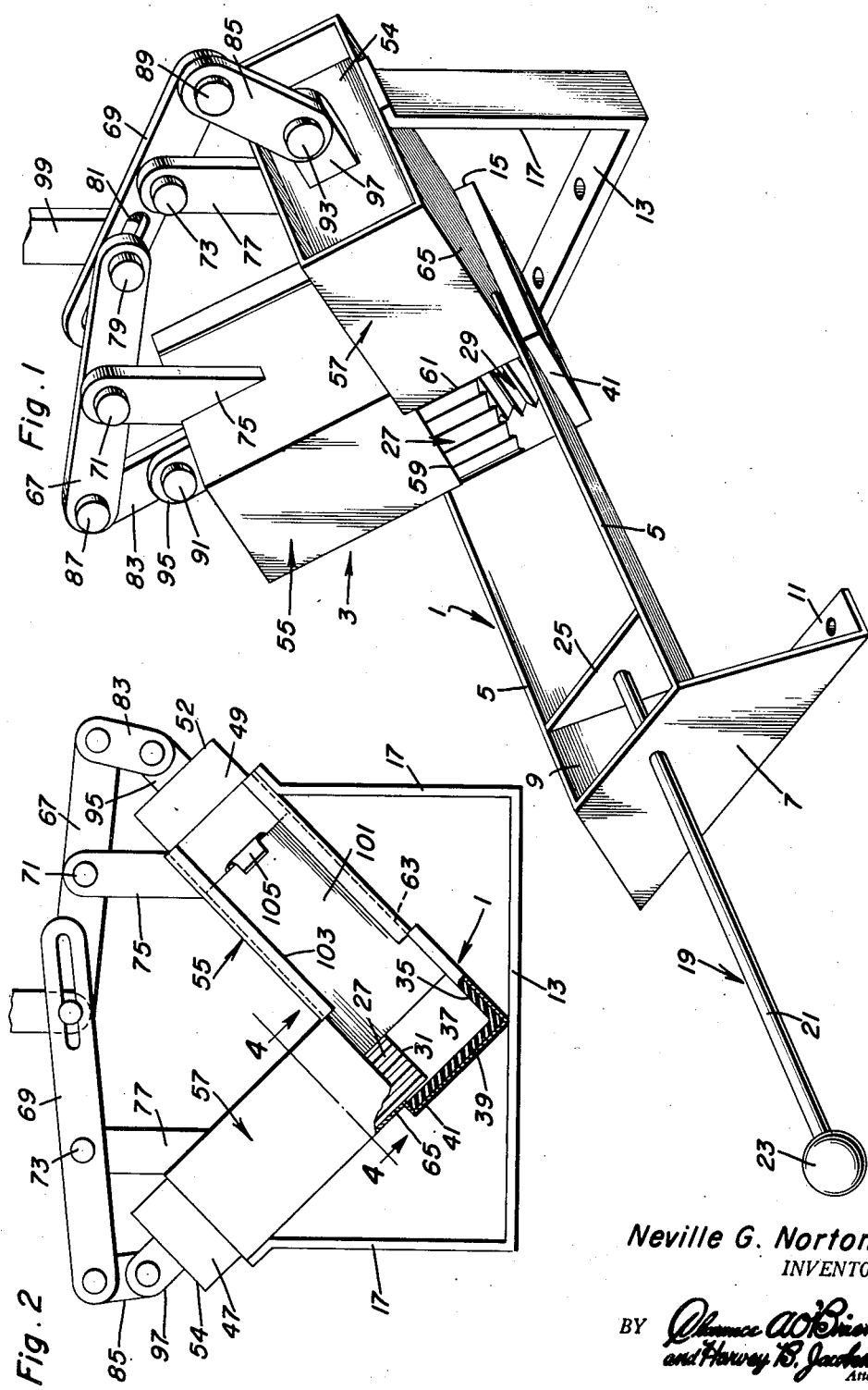

United States Patent Office 2,790,474
Patented Apr. 30, 1957

2,790,474
POTATO CUTTER
Neville G. Norton, Sr., Alice, Tex.

Application June 21, 1956, Serial No. 592,838

5 Claims. (Cl. 146—78)

My invention relates to improvements in potato cutters for cutting potatoes into waffle slices.

The primary object of my invention is to provide for cutting whole potatoes crosswise in one operation into slices having both sides corrugated with the corrugations on each side at right angles to those on the other side to produce a waffle effect.

Another object is to provide a cutter for accomplishing the above by reciprocating cutter blades corrugated and cutting in cross relation to cut a potato into such slices with a minimum of waste.

Still another object is to provide lever and link means for reciprocating the cutter blades in unison uniformly.

Yet another object is to provide a potato cutter in accordance with the foregoing which is simple in construction, will not clog, is well adapted for household use, and for easy quick operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in perspective of my improved potato cutter in the preferred embodiment thereof showing the cutter blades partly advanced for cutting;

Figure 2 is a view in end elevation partly in cross section with the cutter blades retracted;

Figure 3 is an enlarged view in perspective, partly broken away and shown in section and illustrating the cutter blades and plungers for the same;

Figure 4 is an enlarged view in vertical cross section taken on the line 4—4 of Figure 2, and Figure 5 is a perspective view of one of the waffle slices cut by the cutter blades.

Referring to the drawings by numerals, my improved cutter comprises a V-trough designated generally by the numeral 1 for guiding and feeding potatoes therein to a cutter assembly designated generally by the numeral 3.

The trough 1, which is preferably of sheet metal includes right angularly related sides 5, a front end closure plate 7 suitably secured to said sides 5 and extending below the same to support the front end 9 of the trough 1 and having a lateral apertured bottom flange 11. A U-shaped apertured bracket bar 13 underlies and is suitably fixed to the rear end 15 of the trough 1 to support said end 15 and provide a pair of upstanding support arms 17 at opposite sides of the trough 1 for a purpose presently seen. The flange 11 and bar 13 may be bolted to a base such as a table or attached by suitable means to a wall to fix the trough 1 in a generally horizontal position.

A plunger 19 is provided in the trough 1 for advance rearwardly thereof to feed potatoes to and past the cutter assembly 3 and discharge slices cut from the potatoes out of the rear end 15 of the trough 1. The plunger 19 comprises a handle rod 21 slidable through the plate 7 with an operating knob 23 on its outer end, and a triangular pusher plate 25 on its other end slidably fitted in the trough 1.

The cutter assembly 3 comprises two opposite spaced series 27, 29 of oblong, rectangular, cutter blades at opposite sides of the trough 1. The cutter blades of each series 27, 29 are mounted, by means presently described, perpendicular to the sides 5 of the trough 1 in laterally spaced relation in each series and with the blades in each series extending longitudinally at right angles to the blades in the other series and laterally staggered in each series with respect to those in the other series for longitudinal reciprocation in downwardly converging paths to advance the same from a retracted position into crossed right angle and alternating relation in the trough 1.

When the series 27, 29 of blades are fully advanced, leading cutting ends 31, 33 of the blades engage relatively opposite sides 35, 37 of a V-shaped right angled cushion member 39 countersunk flush with opposite sides of the trough 1 in a countersunk portion 41 of said trough. When the series 27, 29 of blades are fully retracted, said leading cutting ends 31, 33 are spaced apart for feed of a potato between said ends.

As is best shown in Figure 3, the series 27, 29 of cutter blades are provided with longitudinal, parallel corrugations 43, 45 of V-shape in cross section extending to the cutting ends 31, 33 and which cut in one series crosswise of those in the other series at right angles thereto.

The series 27, 29 of blades are mounted at rear ends thereof in and project forwardly out of a pair of rectangular, hollow plungers 47, 49 in which said rear ends are suitably fixed with rectangular spacing blocks 51, 53 therebetween and which are also suitably fixed in the plungers. The plungers 47, 49 are formed with closed upper ends 52, 54 for a purpose presently apparent.

The pair of plungers 47, 49 are reciprocably mounted in a pair of rectangular hollow guides 55, 57 open at their ends and disposed over the rear end 15 of the trough 1 at opposite sides of said trough. The guides 55, 57 converge downwardly longitudinally in right angled relation from opposite sides of the trough 1 and extend transversely of said trough with lower ends 59, 61 flaring downwardly, relatively, to provide a space therebetween for passage of potatoes between said ends 59, 61 and through said trough.

Preferably, although not necessarily, bottom walls 63, 65 of the guides 55, 57 are formed integrally with the sides 5 of the trough 1. The before mentioned support arms 17 are suitably fixed to and support said guides 55, 57. The guides 55, 57 are staggered laterally relatively to correspondingly stagger the plungers 47, 49 and the series 27, 29 of cutter blades.

Means is provided for reciprocating the plungers 47, 49 in unison into advanced and retracted position to correspondingly reciprocate the series 27, 29 and cutter blades comprising the following. A pair of rocker levers 67, 69 are pivoted intermediate their ends, as at 71, 73 on upstanding arms 75, 77 on the guides 55, 57 for vertical rocking and to extend longitudinally of the guides 55, 57, side-by-side. A stud and slot connection 79 and 81 between adjacent ends of said levers 67, 69 provide for rocking of the levers in opposite directions respectively. The levers 67, 69 are operatively connected to the upper ends 52, 54 of the plungers 47, 49 by links 83, 85 pivoted, as at 87, 89, to the other ends of the levers 67, 69 and pivoted as at 91, 93 to ears 95, 97 on said ends 52, 54. Any suitable means may be provided for rocking one of the levers 67, 69, for instance a plunger lever 99 pivoted on the stud 79.

A slide plate 101 working in guides 103 is provided on the rear side of one guide, for instance 55, for closing the rear end 15 of the trough 1 to form a stop for locating potatoes in the trough 1 between the cutting ends 31, 33 preparatory to cutting, and which is adapted for opening said end to permit the discharge of slices from the trough. The slide plate 101 is provided with a finger-grip operating tab 105.

Cross wires 107, 109 are provided in the lower ends 57, 59 of the guides 55, 57 between the blades of the series 27, 29 to prevent potato cuttings from clogging said ends.

In operating the described cutter, the slide plate 101 is closed, or partly closed, as shown in Figure 2, and potatoes, not shown, are fed by the plunger 19 along the trough 1 against said plate to position the same between the cutting ends 31, 33 of the series 27, 29 of cutter blades when said series are retracted. The plunger lever 99, or other means, is then operated to rock the lever 67, counterclockwise, as viewed in Figure 1, said lever through the connections 79, 81 rocking the other lever 69 clockwise. Such rocking of the levers 67, 69 operates, through the links 83, 85 to advance plungers 52, 54 in unison from retracted position to correspondingly advance the series 27, 29 of blades to the fully advanced position shown in Figure 3 and through the potatoes until the cutting ends 31, 33 engage the cushion member 39. As the series 27, 29 of the cutter blades advance they cut downwardly from opposite sides of the potatoes crosswise thereof in right angularly related paths to cut the potatoes into complete slices and the corrugations 43, 45 form together with said leading cutting ends 31, 33 corrugate sides on the slices one of which is shown in Figure 5 and designated 100. As will be seen in Figure 5 the corrugations 102 on one side of a slice 100 are at right angles to the corrugations 104 on the other side of the slice. The plunger lever 99 is then operated to rock the levers 67, 69 reversely, whereupon the plungers 47, 49 will be retracted to retract the series 27, 29 of cutter blades clear of the cut strips. Then the slide plate 101 is operated to open the rear end 15 of the trough, and the cut slices or cuttings are discharged out of the rear end 15 of the trough 1 by the plunger 19.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A waffle potato cutter comprising two series of oblong rectangular cutter blades having leading cutting ends and being longitudinally corrugated to said ends, a pair of plungers to which the other ends of the blades of the series are fixed respectively to space the blades in each series apart laterally, means reciprocably mounting said plungers to reciprocate said series of blades longitudinally from a retracted position and in downwardly converging paths and crossed alternating relation in each series with respect to the other series to thrust said series through potatoes positioned between said leading ends, means operatively connected to said plungers for simultaneously reciprocating the same, and means for feeding potatoes between said leading ends when said series of blades are retracted.

2. The combination of claim 1, said plungers being rectangular and hollow and receiving the rear ends of the series of blades therein, and spacers in said plungers between the rear ends of the blades therein.

3. The combination of claim 1, said first named means comprising a pair of rectangular open ended guides mounted in downwardly converging relation and in which said plungers are slidably fitted.

4. The combination of claim 1, said last named means comprising a trough beneath said series of blades extending crosswise thereof, and a plunger operatively connected to said trough for feeding potatoes along said trough.

5. The combination of claim 1, said second named means comprising a pair of pivotally mounted rocker levers pivotally and slidably connected for rocking in unison and pivoted link connections between said levers and said plungers.

References Cited in the file of this patent

UNITED STATES PATENTS

| | | |
|---|---|---|
| 57,111 | Forschner | Aug. 14, 1866 |
| 889,938 | Little | June 9, 1908 |
| 2,088,298 | Love | July 27, 1937 |